(12) United States Patent
Luechinger

(10) Patent No.: US 7,227,087 B2
(45) Date of Patent: Jun. 5, 2007

(54) FILLING SYSTEM IN A BALANCE

(75) Inventor: Paul Luechinger, Uster (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/315,250

(22) Filed: Dec. 23, 2005

(65) Prior Publication Data

US 2006/0137915 A1 Jun. 29, 2006

(30) Foreign Application Priority Data

Dec. 23, 2004 (EP) .................................. 04106976

(51) Int. Cl.
*G01G 21/28* (2006.01)

(52) U.S. Cl. ..................................... 177/180

(58) Field of Classification Search ......... 177/180–181
See application file for complete search history.

(56) References Cited

U.S. PATENT DOCUMENTS

| 6,420,666 B1 * | 7/2002 | Baumeler et al. ........... 177/145 |
| 6,557,391 B2 | 5/2003 | Luechinger |
| 6,603,081 B2 | 8/2003 | Luechinger |
| 2002/0038567 A1 | 4/2002 | Luchinger |
| 2002/0040814 A1 | 4/2002 | Luchinger et al. |
| 2002/0040815 A1 | 4/2002 | Luchinger |

* cited by examiner

*Primary Examiner*—Randy W. Gibson
(74) *Attorney, Agent, or Firm*—Buchanan Ingersoll & Rooney PC (57) ABSTRACT

A receptacle-filling system in a balance with a weighing compartment and with a balance housing containing a weighing cell and forming the rear wall and the floor of the weighing compartment is equipped with a weighing object carrier which is attached to a cantilevered extension of the weighing cell. The extension has a coupling arrangement reaching through passage openings in the rear wall of the weighing compartment, the weighing object carrier being removably attached by the coupling arrangement. Arranged at the rear wall of the weighing compartment is a fixed holder system which allows a source container device to be fastened at different heights above the floor, wherein the source container device includes a source container holder. The weighing object receiver setup is capable of translatory displacement within the weighing compartment in relation to the location of the coupling arrangement and id also capable of being held in the displaced position by the position-adjusting device of the weighing object carrier.

40 Claims, 8 Drawing Sheets

FILLING SYSTEM IN A BALANCE

RELATED APPLICATIONS

This application is based on and claims priority to European Application No. 04106976.6, filed Dec. 23, 2004, the entire content of which is hereby incorporated by reference.

BACKGROUND INFORMATION

A receptacle-filling system in a balance as well as its constituent parts, in particular a weighing object carrier and a source container device are disclosed. The balance used with the system has a weighing compartment and a balance housing that contains a weighing cell and forms the rear wall and the floor of the weighing compartment.

There are a multitude of possibilities for using a balance in a laboratory. Laboratory balances are frequently used for filling substances into receptacles, for example in preparing measured doses of powdery or liquid substances and the like. As a rule, a person entrusted with this task will have developed a working technique that is to a large extent optimized for the prevailing circumstances, i.e., the accessory equipment of the balance, the particular placement of the balance at the work station, the arrangement of the supply containers at the work station, the size and number of the vessels to be filled, etc. Nevertheless, there is a frequent need for further development of these boundary conditions with respect to improved ergonomics. In regard to this opportunity for improvement, the accessory equipment of the balance takes a key position.

A balance which is described in U.S. Pat. No. 6,557,391 B2 has a weighing compartment, a balance housing containing the weighing cell and forming the rear wall and the floor of the weighing compartment, a carrier device which serves to receive the weighing object and is attached to a cantilevered extension of the weighing cell to which a receiving seat for calibration weights of a calibration device is attached. The cantilevered extension has a coupling arrangement which reaches through passage openings in the rear wall of the weighing compartment and serves as a means for removably attaching the weighing object carrier to the cantilevered extension. The floor of the weighing compartment extends as a closed separating wall between the receiving seat for the calibration weights and the weighing object carrier. The weighing object carrier can be configured as a level grate or in another embodiment as a holder for one or more laboratory vessels, where the holder can also be configured so that it can swivel about an axis. This opens up a multitude of application possibilities for the balance and thus ensures improved manual operating conditions from an ergonomics point of view.

A balance which is described in U.S. Pat. No. 6,603,081 B2 has a weighing compartment, a balance housing containing the weighing cell and forming the rear wall and the floor of the weighing compartment, a carrier device which serves to receive the weighing object and is attached to a cantilevered extension of the weighing cell. A fixed holder system is attached to the rear wall of the weighing compartment, which allows weighing compartment accessories to be fastened at different heights above the floor of the weighing compartment. A holder for laboratory devices or an intermediate floor can be attached to the holder system, where the intermediate floor can be useful as a place on which to set substance containers, tools, etc. The holder system is configured so that a laboratory device or the intermediate floor is easy to fasten or to remove. The laboratory devices envisaged here include for example dosage delivery devices for powdery or liquid substances.

The balances of the foregoing description are not optimized in every respect for the dispensing of substances, in particular if the substance quantities are small and therefore have to be dispensed into receptacles with a narrow opening. For example when using a generally known type of balance, the receptacle which is to be weighed while being filled cannot be set up at the location in the weighing compartment that is ergonomically most appropriate for the fill-weighing process. Furthermore, when a substance to be filled into a receptacle has to be transferred out of a source container that is located outside of the weighing compartment, a time-consuming manipulation is required as one frequently has to pass several times through an opened window of a draft shield which is normally present, and as a result the thermal equilibrium in the weighing compartment can be disturbed by air drafts.

In the case of the balance described above which belongs to the known state of the art, wherein the source container for the substance to be dispensed can be placed inside the weighing compartment for example on the intermediate floor, the space situation in the weighing compartment often requires carefully controlled hand movements so that a source container that may have been set on the intermediate floor does not get knocked over. There is further the risk that the air in the weighing compartment gets warmed up too much if the user's hand remains in the weighing compartment too long while performing the filling operation.

SUMMARY

An ergonomic design of a carrier is disclosed that receives the weighing substances or the weighing substance receptacle, i.e., a weighing object carrier. An ergonomic design of the source container device for the substances to be dispensed is also disclosed. Exemplary embodiments include a filling system for a balance which allows a time-saving work technique for the user of the balance.

A weighing object carrier in a balance in which a weighing compartment is separated by a rear wall from a weighing cell is removably attached to a cantilevered extension of the weighing cell which has a coupling arrangement reaching through passage openings in the rear wall of the weighing compartment. The weighing cell is accommodated in a housing which forms the rear wall and the floor of the weighing compartment. The weighing object carrier has a weighing object receiver setup which in relation to the location of the coupling arrangement is capable of translatory displacement and of being held in the displaced position by means of a position-adjusting device of the weighing object carrier.

The weighing object receiver setup can thus be put in almost any desired position inside the weighing compartment, so that the process of filling a weighing receptacle placed on the weighing object receiver setup is ergonomically improved, since the position most favorable for the manual operation can be selected for the weighing object receiver setup. For example if a source container is placed outside of the weighing compartment, the weighing object receiver setup can be brought to a place inside the weighing compartment that is close to an opening of the draft shield of the balance. This has first of all the result that the distance is shortened between the source container and the weighing substance receptacle, and second, it avoids the need for the operator to put his hand in the weighing compartment, which could lead to an undesirable warming of the air in the weighing compartment. In particular, with the weighing object receiver setup being adjustable, a weighing receptacle placed on the weighing object receiver setup can be filled from the right or from the left, depending on whether the balance is being operated by a right- or left-handed person. The adjustment of the weighing object receiver setup by means of the simple-to-operate position-adjusting device—preferably configured as clamping screws—allows the weighing object receiver setup to be positioned in a way that fits the task to be performed as well as the work habits of the user.

In particular, the orientation and the location of the weighing object receiver setup within the weighing compartment in relation to the position of the coupling arrangement can be adjusted by means of the position-adjusting device of the weighing object receiver setup through a translatory displacement and a rotation.

This is achieved preferably through an arrangement which allows adjusting the height of the weighing object receiver setup above the floor of the weighing compartment and/or moving the weighing object receiver setup in a translatory displacement perpendicular to the rear wall and locking it into the moved position.

Likewise, a further embodiment of the invention provides the possibility to swivel the weighing object receiver setup about a vertical axis close to the rear wall and/or to rotate the weighing object receiver setup about an axis that is orthogonal to the rear wall.

In a preferred further development of the invention, the weighing object receiver setup has a seat area for a weighing receptacle, wherein the position of the weighing object receiver setup is adjustable through a rotation about an axis perpendicular to the seat area and/or through a translatory displacement perpendicular to the seat area, and the weighing object receiver setup can be held in the adjusted position.

In a particularly advantageous embodiment, the weighing object receiver setup has a seat area for a weighing receptacle and a shaft on the opposite side from the seating area. A connecting element of the weighing object carrier to the weighing object receiver setup is equipped with a bore hole, with the shaft engaging the bore hole so that the weighing object receiver setup is rotatable about an axis that extends lengthwise in the shaft and/or the weighing object receiver setup can be moved in a translatory displacement along the shaft relative to the connecting element.

In a further embodiment, the weighing object receiver has a vertically oriented rod located near the rear wall and passing through a connecting element of the weighing object receiver setup, where the height adjustment of the weighing object receiver setup is effected by moving the connecting element along the rod. The connecting element from the weighing object carrier to the weighing object receiver setup can also be configured as a pullout extension holder which includes an extension rod and a sleeve, where the extension rod can slide into or out of the sleeve and/or the extension rod is rotatable about an axis that extends in the lengthwise direction of the sleeve.

The weighing object receiver setup in a particularly preferred embodiment has the form of a grate as a seating cradle for a weighing receptacle with the ends of the grate bars bent off at a 90° angle, or of a holder sleeve for receiving a weighing receptacle consisting of an electrically isolating material, or as a channel for receiving an oblong weighing receptacle, or of a holder cage for receiving a plurality of small reaction vessels with narrow necks. The grate bars of the weighing object receiver setup are encased at least partially in a polymer material to protect the weighing vessels from sliding out of place.

A filling system in a balance with a weighing compartment and with a balance housing that forms the rear wall and the floor of the weighing compartment is equipped with a weighing object carrier that has a weighing object receiver setup and is attached to a cantilevered extension of the weighing cell. The cantilevered extension has a coupling arrangement which reaches through passage openings in the rear wall of the weighing compartment and serves to removably attach the weighing object carrier. Arranged at the rear wall of the weighing compartment as a further component of the filling device is a fixed holder system which serves to fasten a source container device at different heights above the weighing compartment floor and which includes a source container holder. By means of the position-adjusting device, the weighing object receiver setup is movable in translatory displacement in the weighing compartment relative to the position of the coupling arrangement and can be held in the adjusted position, while the source container holder—by means of the source container position-adjusting device—can be moved in translatory displacement in the weighing compartment relative to the position of the holder system and held in the adjusted position.

This allows the adoption of work procedures that are tailored to the needs of the user of a balance and the requirements of a filling process when filling a substance by weight into a weighing receptacle placed on a weighing object carrier.

In particular, the orientation and the location of the weighing object receiver setup within the weighing compartment in relation to the position of the coupling arrangement can be adjusted by means of the position-adjusting device of the weighing object receiver setup through a translatory displacement and a rotation. In a preferred further developed version of the invention, the orientation and the location of the source container holder within the weighing compartment in relation to the position of the holder system can be set by means of a position-adjusting device of the source container device through a translatory displacement and a rotation. This ensures the highest level of flexibility in filling a substance into a receptacle by weight.

In a preferred design, the source container device is removably attached to the holder system by means of a suspension device. The source container device can be configured for the attachment of one or more, in particular two, source container holders.

The source container device in a preferred embodiment is equipped with a U- or L-shaped bracket to which the source container holder is removably attached. Under this concept, the source container holder has an L-shaped holder arm with a curved portion where an arrangement of parallel grate bars is attached to the holder arm. The grate bars are in particular at least partially encased in a polymer material to prevent a source container from sliding out of place.

In a particularly preferred design, an intermediate floor composed of two flat plates of a transparent material which are connected in an L-shape can be attached to a holder system by means of a further suspension device which is provided in addition or as an alternative to the suspension device of the source container device.

BRIEF DESCRIPTION OF THE DRAWINGS

Examples of the invention are illustrated hereinafter in the drawings which are strongly simplified schematic representations, wherein.

DETAILED DESCRIPTION

Figure 1:
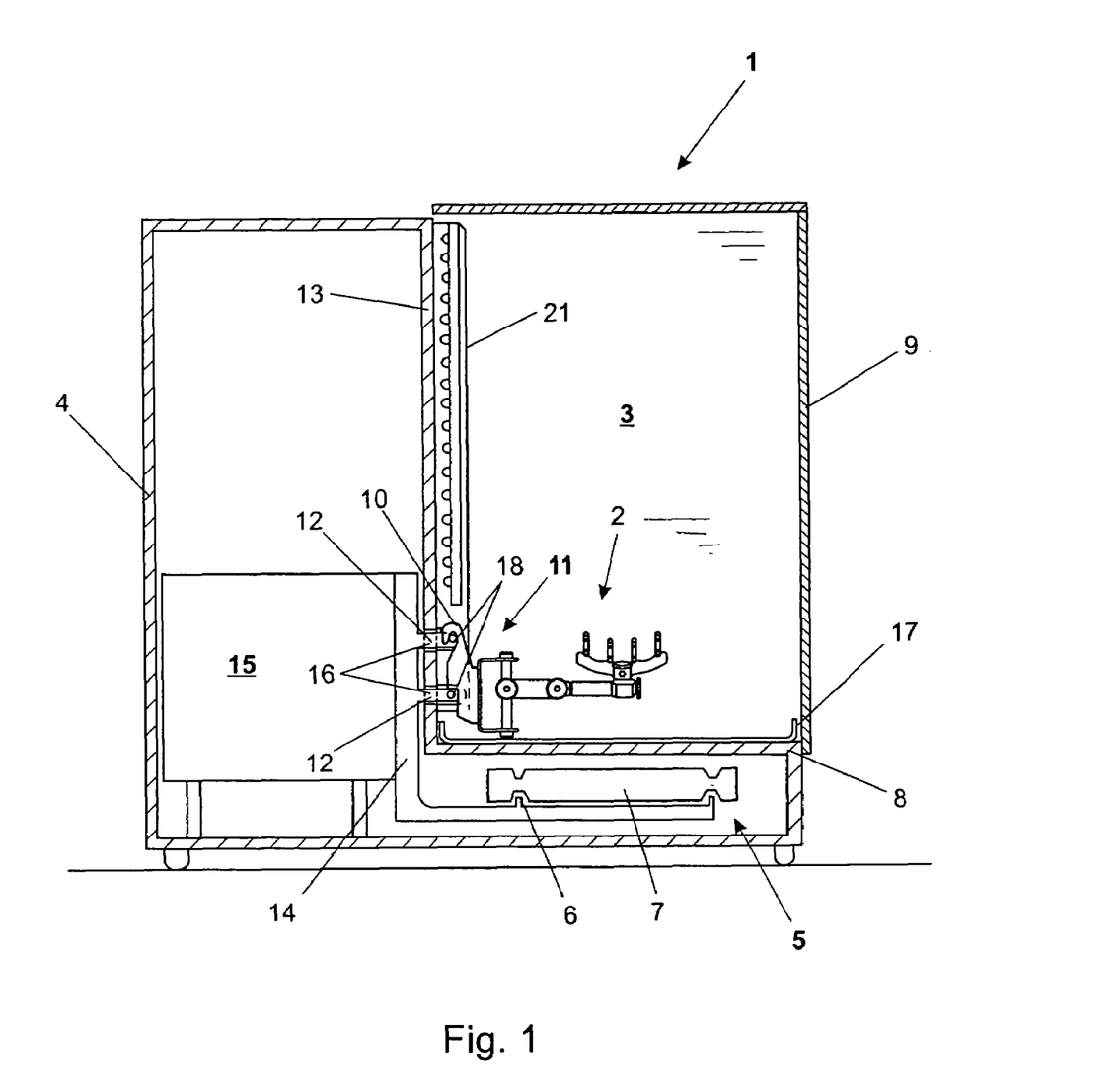
FIG. 1 represents a side view of the balance with a weighing object carrier according to an exemplary embodiment of the invention.

FIG. 1 shows a side view of the balance 1 with the balance housing 4 and with the draft shield 9 surrounding the weighing compartment 3. Inside the balance housing 4 is the weighing cell 15 which is not shown in detail here. To introduce the weighing force into the weighing cell 15, an L-shaped cantilevered extension 14 with the calibration device 5 is connected to the weighing cell 15, wherein the lower part of the cantilevered extension 14 has a receiving seat 6 for at least one calibration weight 7. The calibration device 5 is located in a part of the balance housing 4 that is closed off on top by the floor 8 of the weighing compartment 3. The vertical leg of the L-shaped cantilevered extension 14 has projections 16 directed towards the weighing compartment 3 which reach through passage openings 12 of the rear wall 13 of the weighing compartment 3. Said projections 16 with the laterally protruding holder bolts 18 form a coupling arrangement serving to attach the weighing object carrier 2 by means of a coupling element 11. The weighing object carrier 2 serves to receive a diversity of setups for different weighing applications, for example for weighing material containers or for the weighing objects themselves. The weighing object carrier 2 in the illustrated example is configured as a grate with bent-off grate bars, as will be discussed below in further detail with reference to the FIGS. 4 and 5.

A spill-catching tray 17 in FIG. 1 serves to catch weighing material that has fallen off the weighing object carrier 2. The spill-catching tray 17 can be designed so that it can be taken out, which makes the weighing compartment 3 easy to clean.

The rear wall 13, on the side facing into the weighing compartment 3, is equipped with a holder system 21 which is located above the area of the coupling element 11 where the weighing object carrier 2 is hooked up through the laterally protruding holder bolts 18 that are close to the wall. This holder system 21 offers a multitude of conveniences and applications for the weighing activity. In particular, the holder system 21 which is arranged on the rear wall 13 allows weighing compartment accessories to be attached at different heights above the floor 8. This opens up the possibility for conducting experiments and for filling substances into containers inside the weighing compartment 3.

Figure 2:
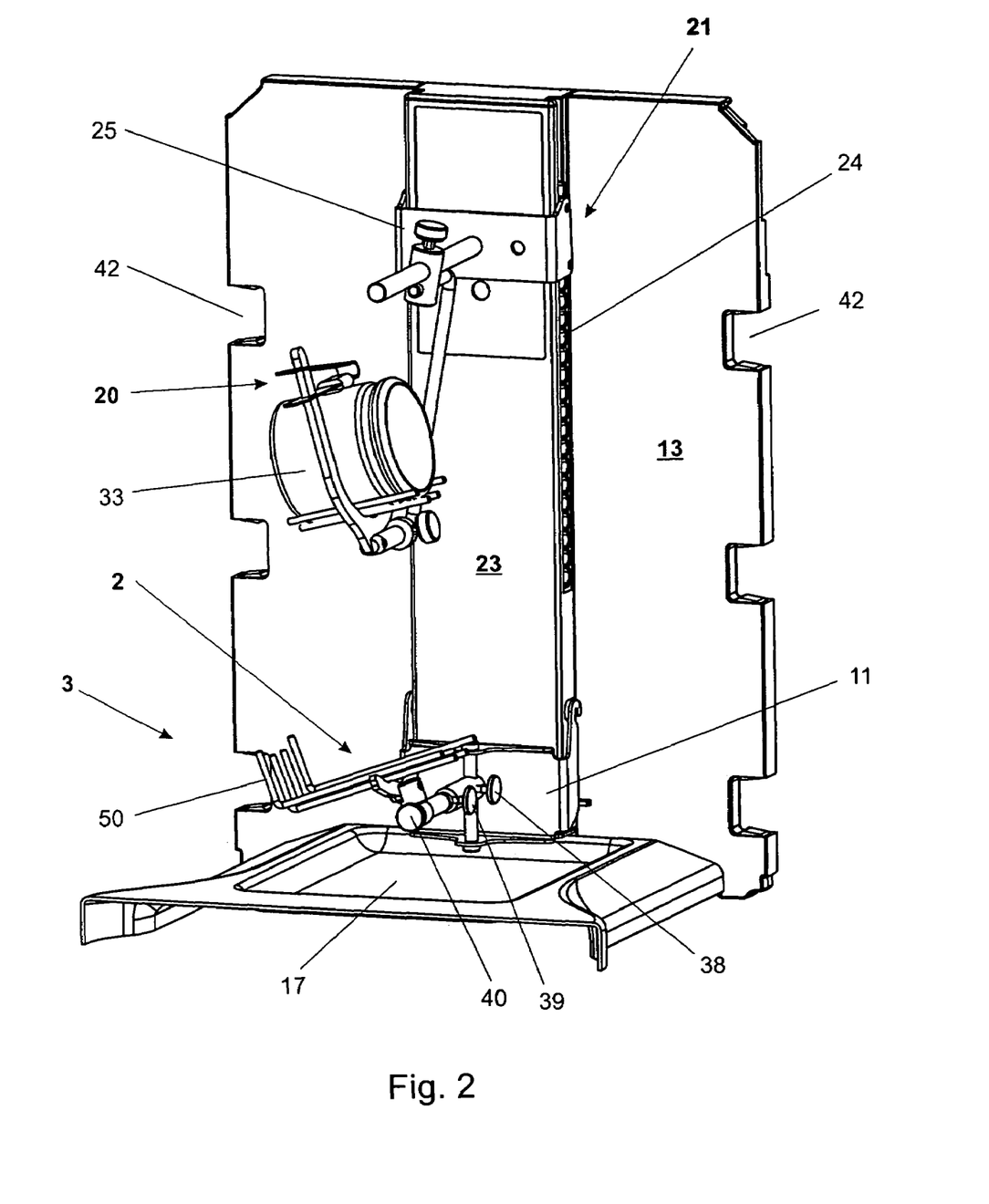
FIG. 2 represents a three-dimensional illustration of the view into the weighing compartment, including a weighing object carrier, also showing the holder system attached to the rear wall and holding a source container device.

FIG. 2 gives a three-dimensional view into the weighing compartment 3 with the elements of a receptacle-filling system, showing a possible arrangement of the receptacle-filling system in the weighing compartment 3. Of the walls delimiting the weighing compartment 3, only a spill-catching tray 17 integrated in the floor 8 (see FIG. 1) and the rear wall 13 are visible. Attached to the rear wall 13 is the holder system 21. The latter is configured as a column 23 shaped in relief out of the rear wall 13. Vertical grooves 24 run in both flanks of the column 23. The coupling arrangement of the weighing object carrier 2 which includes the projections 16 with the laterally protruding holder bolts 18 shown in FIG. 1 is arranged in the lower area of the column 23 in line with the grooves 24. Arranged at regular intervals on one side of each of the grooves 24 are semicircular cutouts designed for a form-fitting engagement by pegs of the suspension device 25 of the source container device 20. Shown in this drawing is a source container 33 for weighing material to be dispensed lying on its side in the source container device 20. A holder system 21 as well as a device for attaching weighing compartment accessories to the holder system 21 are described in detail in U.S. Pat. No. 6,603,081 B2 and will therefore not be further discussed herein.

The suspension device 25 is configured as a component of the source container device 20, coupling the latter to the holder system 21 in a manner that allows the source container device 20 to be removed again from the holder system 21. The source container device will be discussed in detail hereinafter in the context of FIGS. 10 to 13.

FIG. 2 shows a weighing object carrier 2 in the lower part of the weighing compartment 3. The latter is releasably connected by means of a coupling arrangement to a cantilevered extension (invisible in this drawing) of the weighing cell 15. The weighing object carrier 2 is equipped with a position-adjusting device with different adjusting elements for positioning the weighing object receiver setup which in this case is configured as a grate 50 with grate bars 49 that are angled off at 90°. The detailed description of this weighing object carrier 2 is presented farther below in the context of FIGS. 3 and 4.

The rear wall 13 has on each side three cutouts 42 which can be provided with exchangeable clip-on covers (not shown). The clip-on covers can be removed from one or more of the cutouts 42 for example to allow supply connections of any kind to be brought into the weighing compartment through the closed draft shield, e.g., electrical conduits and/or hoses to bring in fluids to be weighed. These cutouts and clips are the subjects of an invention described in U.S. Pat. No. 6,686,545 and will not be further discussed herein.

Figure 3:
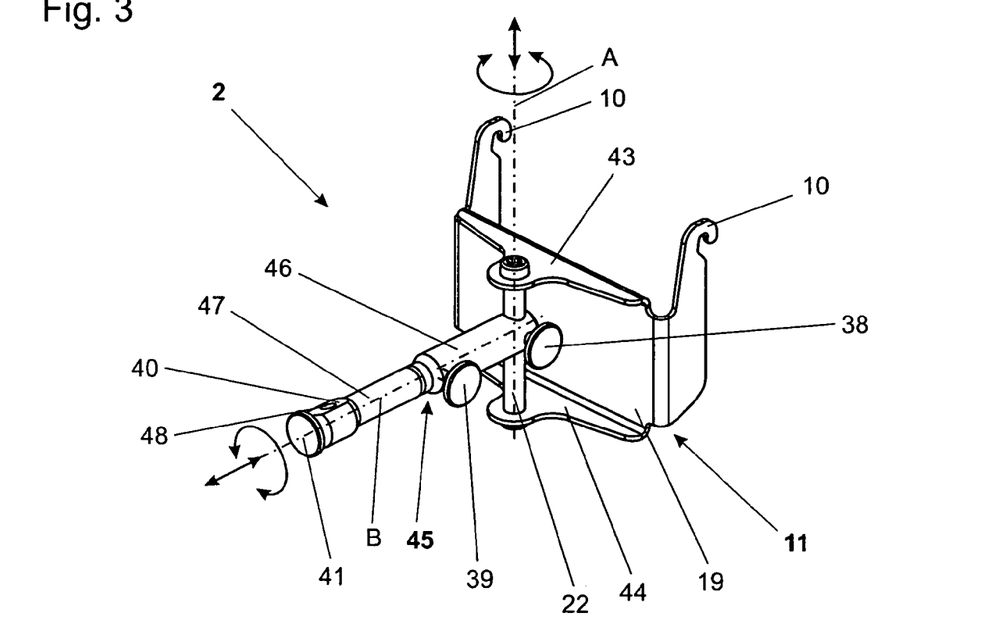
FIG. 3 represents a weighing object carrier without a weighing object receiver setup, in a three-dimensional view.

FIG. 3 gives a perspective view of a weighing object carrier 2 without a weighing object receiver setup. The suspension devices 10 are configured as hook-shaped extensions on both sides of the coupling element 11, which are connected to each other through a connector portion 19 which may be of a rectangular shape. Midway in the connector portion 19, a rod 22 is held in place between an upper and a lower fastening lug 43 and 44, respectively, wherein the rod 22 is oriented vertically when the balance is set up in its operating position. The rod 22 passes with a small amount of play through a bore hole of the sleeve 46 of a pullout extension holder device 45 which can be deployed along its axis B. The bore hole is perpendicular to the longitudinal axis of the sleeve 46, so that the pullout extension holder device 45 can be moved up and down along the rod 22 and also rotated about the rod 22. The pullout extension holder device 45 is locked in place by a first clamping screw 38 which enters the sleeve 46 at a right angle and clamps the rod 22 into place in the sleeve 46. Thus, the position of the weighing object receiver setup in the weighing compartment 3 is height-adjustable by means of a translatory movement and/or swivel-adjustable by means of a rotary movement about the longitudinal axis A of the rod 22.

The pullout extension holder device 45 has an extension rod 47 which can slide into or out of the sleeve 46 and at whose opposite end from the rod 22 the weighing object receiver setup can be fastened. A second clamping screw 39 which is arranged parallel to the clamping screw 38 serves to lock the extension rod 47 in the sleeve 46. With the second clamping screw 39, the position of the weighing object receiver setup within the weighing compartment 3 can be adjusted by means of a translatory displacement in the direction of the longitudinal axis of the extension rod 47. With the simultaneous possibility of a rotation about the longitudinal axis A of the rod 22, the weighing object carrier can be positioned in a horizontal plane. Furthermore, the position of the weighing object receiver setup within the weighing compartment 3 can be adjusted by means of a rotary movement about the longitudinal axis of the pullout extension holder 45.

The pullout extension holder 45 represents a connecting element between the rod 22 and the weighing object receiver setup. The portion 40 of the extension rod 47 of the pullout extension holder 45 where the weighing object receiver setup can be attached is widened in comparison to the rest of the extension rod 47 and flattened on one side of its circumference. A passage hole 48 from the middle of the flattened area 40 through the extension rod 47 serves for the engagement of a peg of the weighing object receiver setup. The peg can be locked by means of a third clamping screw 41.

Figure 4:
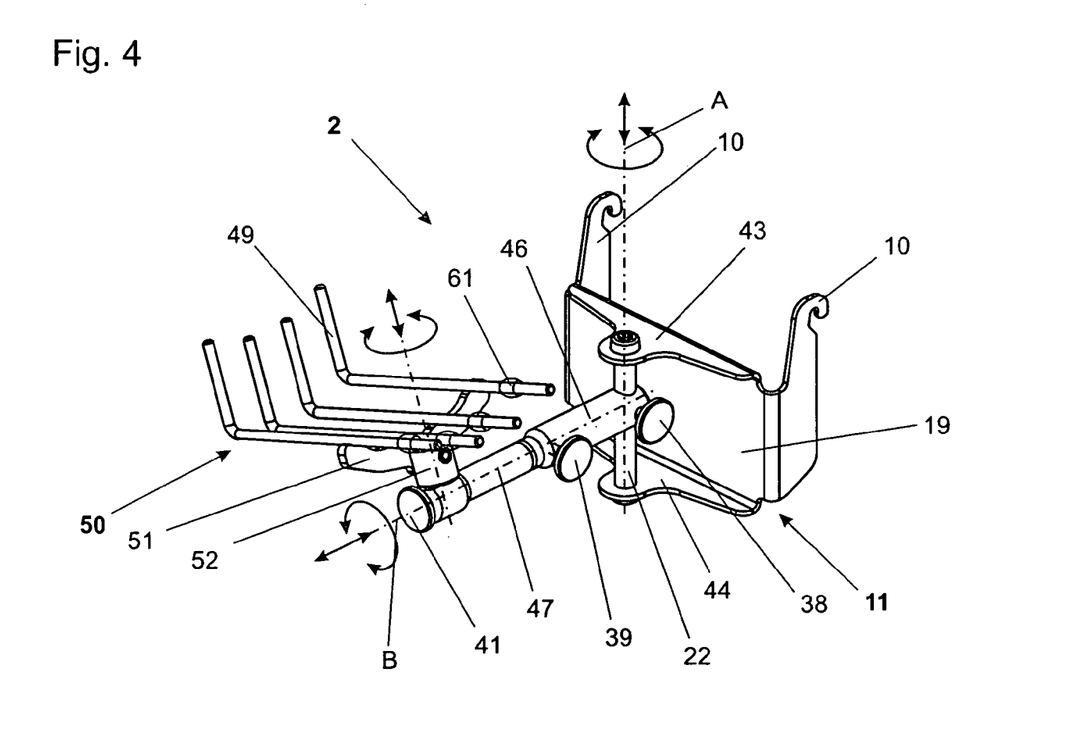
FIG. 4 represents a weighing object carrier with a weighing object receiver setup, in a three-dimensional view.

FIG. 4, in a representation that is analogous to FIG. 3, includes all elements of the weighing object carrier 2 that were shown in FIG. 3 and in addition illustrates the weighing object receiver setup in the shape of a grate 50 with grate bars 49 that run parallel to each other and are angled at 90°.

Figure 5:
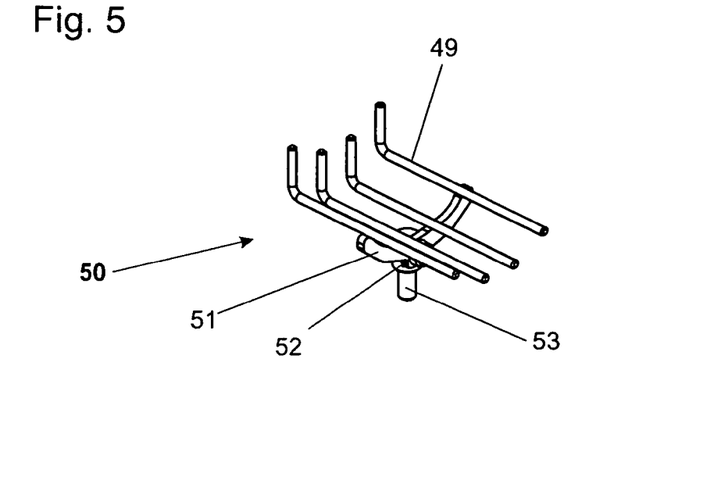
FIG. 5 represents a weighing object receiver setup in the shape of a grate with grate bars bent at a 90° angle, in a three-dimensional view.

The grate bars 49 thus form a receiving seat for a preferably cylinder-shaped weighing vessel which rests preferably with its cylindrical surface lying on the grate 50. To prevent the weighing vessel from sliding out of place, the individual grate bars 49 are encased with a ring 61 or a sleeve of a polymer material. As an equivalent measure, the grate bars 49 could also be at least partially coated with a polymer material, preferably of an electrically conductive kind. On the side of the grate 50 that faces away from the seating area, the grate bars 49 are fastened to an arc-shaped base 51. The arc-shaped base 51 is joined to a cylinder-shaped holder 52. The latter has an axially protruding peg 53 in the middle of the end surface on the opposite side from the arc-shaped base 51, as can be seen in FIG. 5 which shows the grate 50 in a three-dimensional view. The grate bars 49 are fastened to the arc-shaped base 51 in a substantially orthogonal orientation relative to the peg 53. When the third clamping screw 41 is loosened, the weighing object receiver setup, in this case the grate 50 can be rotated with the peg in the bore hole 48. The weighing object receiver setup can also be moved in a translatory displacement along the peg 53 relative to the flattened area 40 on the extension rod 47 of the pullout extension holder 45.

By loosening the second clamping screw 39, the weighing object receiver setup, in this case the grate 50, can be rotated together with the extension rod 47 about the axis B of the latter, so that the seating area of the grate bars 49 is slightly inclined relative to the horizontal position. In other words, the 90°-angled end of the grate bars 49 lies lower than the straight end. Thus, a weighing vessel can be put in place on the weighing object receiver setup without the risk of tipping over.

Depending on whether the filling process into a weighing receptacle is performed with the left or right hand, the weighing object receiver setup with the weighing receptacle (not shown here) can be swiveled about the peg 53 as an axis C into the appropriate position, so that the opening of the weighing receptacle can be reached easily from a desired position.

With a rotation about the axis A which extends along the rod 22, the weighing object receiver setup can be brought into almost any desired position in the lower part of the weighing compartment 3, in particular by making use of the extendibility of the extension rod 47 of the pullout extension holder 45 and further making use of the height-adjustability along the rod 22.

Figure 6:
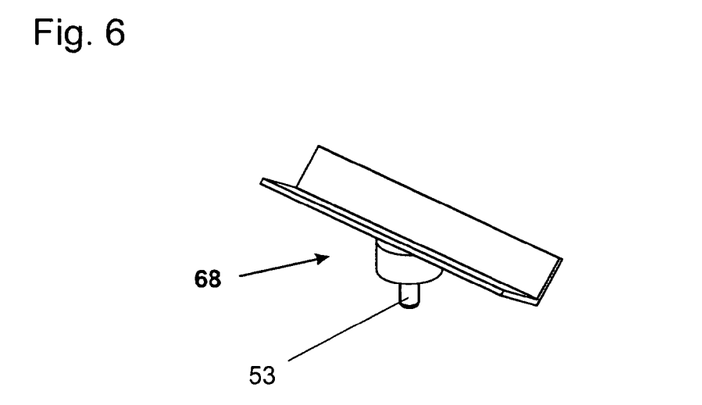
FIG. 6 represents a weighing object receiver setup in the shape of a V-shaped channel designed to receive oblong weighing vessels, for example NMR vials.

FIG. 6 shows a three-dimensional representation of a further embodiment of a weighing object receiver setup which is configured in this case as a V-shaped seating channel 68 for elongated weighing vessels, in particular NMR vials. The seating channel 68 can also have a U-shaped profile.

Figure 7:
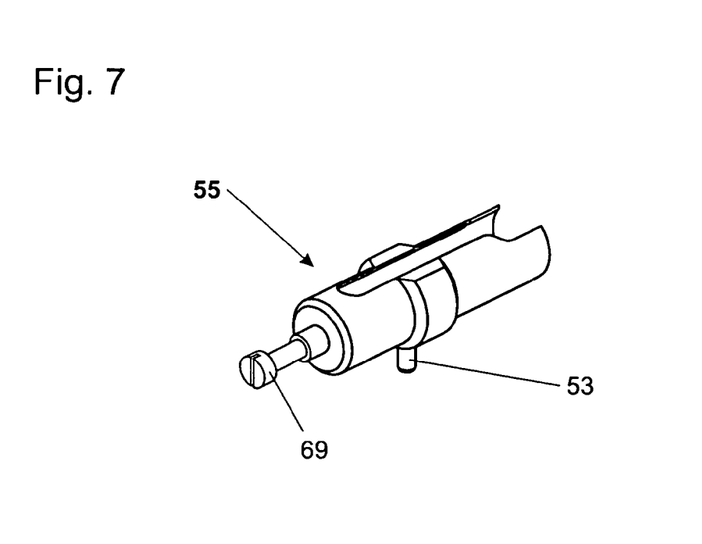
FIG. 7 represents a weighing object receiver setup in the shape of a receiving sleeve for cylindrical vessels, in a three-dimensional view.

Again in three-dimensional representation, FIG. 7 shows a further embodiment of a weighing object receiver setup— here in the shape of a receiving sleeve 55 which serves as a seat for a weighing receptacle that consists of an isolating material, preferably of a polymer. The metallic receiving sleeve 55, made preferably of aluminum, is connected to ground through the peg 53 together with the entire weighing object carrier 2 which consists likewise of metal. This prevents the weighing receptacles from becoming electrostatically charged, which could cause errors in the weighing results. On the opposite end from its opening, the receiving sleeve 55 has a screw 69 that can be turned to a desired insertion depth so that the seating depth inside the receiving sleeve 55 can be adjusted for weighing vessels of different length, keeping the opening of a weighing receptacle always flush with the opening of the receiving sleeve 55. Consequently, no weighing material that may have been spilled can accumulate in the receiving sleeve 55.

Figure 8:
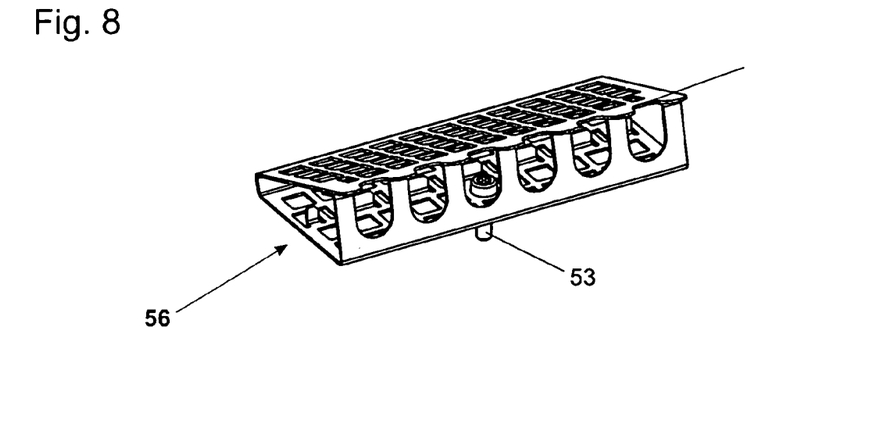
FIG. 8 represents a weighing object receiver setup in the shape of a receiving cage for a plurality of cylindrical or conical vessels, in a three-dimensional view.

FIG. 8 represents a perspective view of a weighing object receiver setup in the form of a receiving cage 56 for a plurality of small narrow-necked weighing receptacles. The latter can for example be centrifuge containers or small reaction vessels into which, for example, a powdery substance may be dispensed first, followed by the addition of solvent fluid with a multi-channel pipette for preparing solution samples. With the receiving cage 56 made of perforated sheet metal, the formation of an electrostatic charge on the small reaction vessels 57 which are preferably made of polymer material is avoided.

Figure 9A:
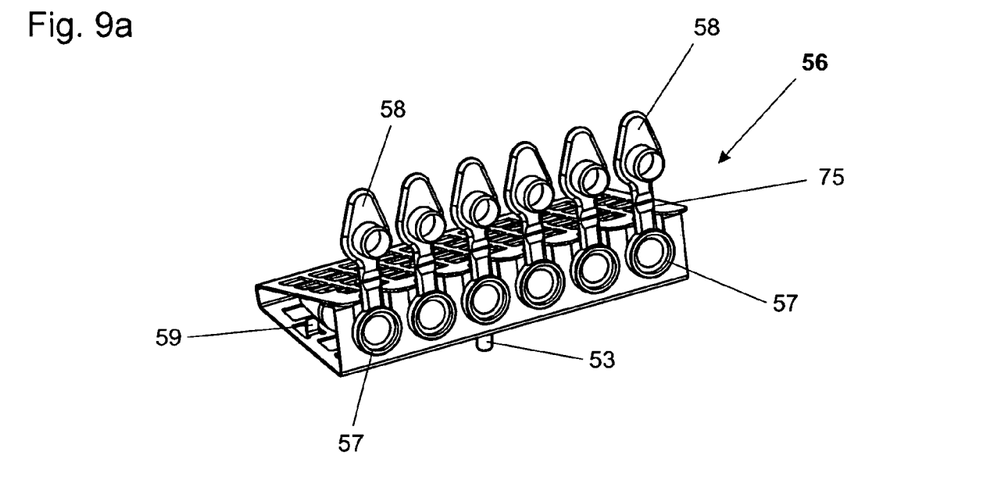
FIG. 9a represents a weighing object receiver setup in the shape of a receiving cage with several small reaction vessels with covers, in a three-dimensional view.

FIG. 9a shows the weighing object receiver setup of FIG. 8 in the form of the receiving cage 56 in the same view, but with several small reaction vessels 57 seated in place. The reaction vessels have a cylindrical shape that is conically tapered towards the bottom of the vessel and are equipped with a cap 58. The upward-bent flaps 59 serve to position the small reaction vessels 57. The notches 75 serve to receive the caps 58.

Figure 9B:
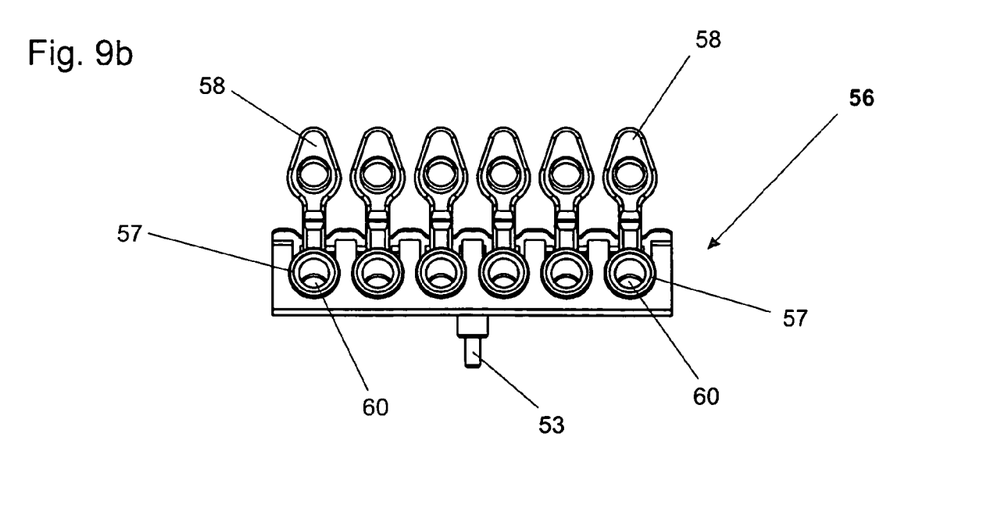
FIG. 9b represents a weighing object receiver setup in the shape of a receiving cage with several small reaction vessels with covers, viewed from the side of the fill openings.

FIG. 9b shows the weighing object receiver setup in the form of a receiving cage 56 with a plurality of cylindrical or conical small reaction vessels 57 with caps 58 as in FIG. 9a, but viewed from the side of the fill openings 60. As described already in the context of FIGS. 4 and 5, the receiver setup 56 can also be tilted at an inclined angle relative to the horizontal position.

Figure 10:
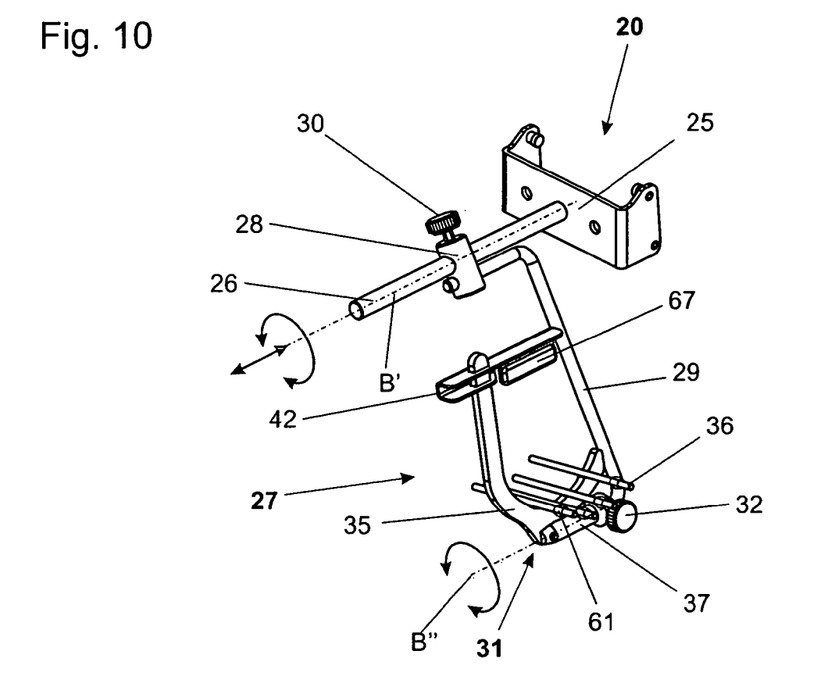
FIG. 10 represents a source container device without a source container, shown in a three-dimensional view.

FIG. 10 shows a perspective view of the source container device 20 for the weighing material to be filled into receptacles, without a source container 33 set in place. As seen in FIG. 2, the suspension device 25 allows the entire source container device 20 to be moved in the vertical direction along the holder system. The suspension system 25 includes a rod 26 projecting into the weighing compartment 3 at a right angle to the rear wall 13. A holder device 27 can be attached to the rod 26 by means of a fastening element 28. The illustrated fastening element 28 has a cylindrical shape with a bore hole traversing the element 28 at a right angle to the cylinder axis, wherein in the assembled state of the holder device 27 the rod 26 passes through the bore hole. A fourth clamping screw 30 which is inserted into the fastening element 28 from an end surface of the cylinder barrel serves to keep the holder device 27 for a source container tightly clamped in a fixed position. By loosening this fourth clamping screw 30, the holder device 27 can be tilted about the longitudinal axis B' of the rod 26. After loosening the clamping screw 30, the holder device can also be moved along the rod 26, so that the position of the source container device 20 can be adjusted through a translatory displacement as well as a rotation relative to the holder system. A source container 33 placed in the holder device 27 (see FIGS. 12a to 12c) can thus be brought to a location within the weighing compartment 3 that is suitable for the filling process and positioned with a likewise convenient orientation of the opening of the source container 33. This also includes the choice of working either with the right hand or the left hand.

The holder device 27 includes a U-shaped connector bracket 29 and a source container holder 31, where the latter is removably attached to the bracket 29. The attachment is made by means of a cylinder 37 that is screwed to the source container holder 31 and has a blind bore hole that fits over one U-leg of the connector bracket 29. To secure the connection, a fifth clamping screw 32 reaches from the circumference of the cylinder barrel into the blind bore hole. When the fifth clamping screw 32 is loosened, the source container holder 31 can be tilted about the longitudinal axis B" of the U-leg of the connector bracket 29, whereby the position of the source container holder 31 can be adjusted by a rotary movement about the further axis B" which runs substantially parallel to the first axis B'. The source container holder 31 is further slidable along the U-leg of the connector bracket 29.

To support a source container 33 (see FIG. 2), the source container holder 31 has an L-shaped holder arm 35 with a curved portion where four grate bars 36 arranged parallel to each other are at their mid-points welded to the holder arm 35 and thus form a supporting seat for the source container 33. To prevent the source container 33 from slipping out of place, the individual grate bars 36 are encased in a ring or sleeve of a polymer material. As an equivalent measure, the grate bars 49 could also be at least partially coated with a polymer material, preferably of an electrically conductive kind. To secure the source container 33 in the source container holder 31, there is a clamping element 42 with a rectangular opening through which the L-shaped holder arm 35 passes with a slight amount of play. As the latter has a rectangular cross-section, the clamping element 42 will jam up when it is in a slightly skewed position and will thus stay put in the secured state of the source container 33. In order to prevent damage to the source container 33, the clamping element has a polymer lining 67 at the place where the clamping element is in contact with the source container 33.

Figure 11:
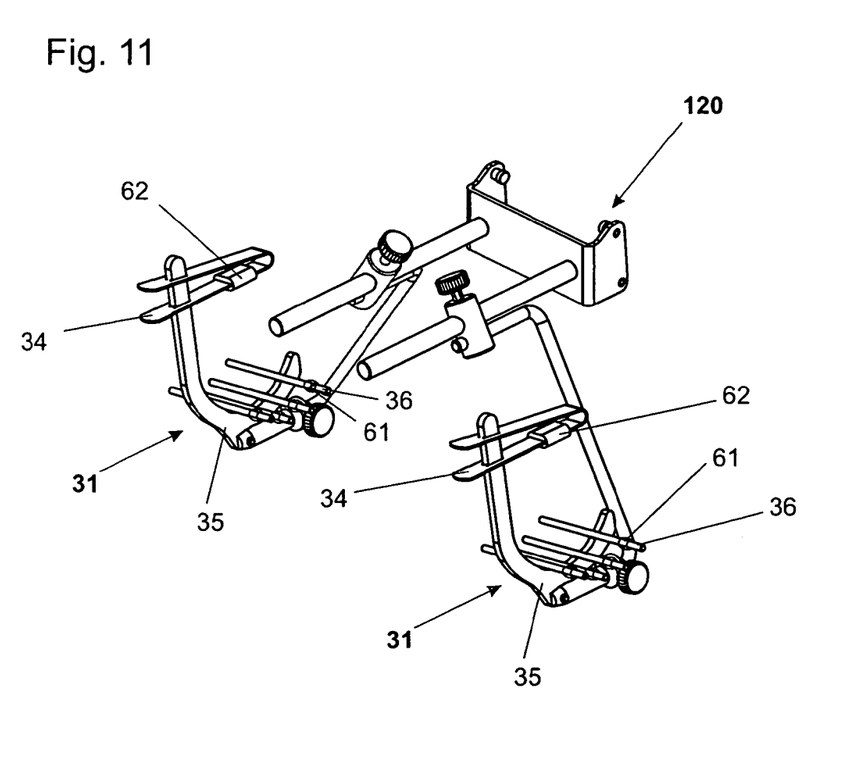
FIG. 11 represents a further embodiment of the source container device including two source container holders, but without source containers, in a three-dimensional view.

FIG. 11 illustrates a further embodiment of the source container device 120 for the weighing material to be filled into receptacles. In contrast to the embodiment of FIG. 9, the embodiment of FIG. 11 is distinguished by having two rods 26, each with a holder device 27. In the process of dispensing a measured dosage into a weighing receptacle, the arrangement of FIG. 11 makes it possible to take two different substances out of two different source containers, for example to prepare a mixture. Thus, each of the source containers 33 by itself, seated in its respective holder device 27, can be brought to a suitable place in the weighing compartment 3 and positioned with its opening in a suitable orientation for the filling process. Of course, it is also possible to attach two holder devices 27, each with a source container 33, to a rod 26 as shown in FIG. 10, wherein the rod 26 could possibly be lengthened.

In the illustrated example, each source container 33 is held in its source container holder 31 by means of a spring clip 34. The latter is made of a piece of sheet metal that is bent into the shape of a rounded V and has two openings for the longer leg of the L-shaped holder arm 35 to pass through with a slight amount of play. In its released state, the position of the spring clip 34 is secured on the L-shaped holder arm 35 by jamming. By squeezing the spring clip 34 together, it can be moved along the L-shaped holder arm 35. To prevent the source container 33 from damage and from slipping out of place, the spring clip 34 is covered by a soft sleeve 62, for example of rubber or plastic, at the place of contact with the source container 33. Four grate bars 37 which run parallel to each other are welded at their mid-points to the curved portion of the L-shaped holder arm 35, forming a seat for the source container 33.

Figure 12A:
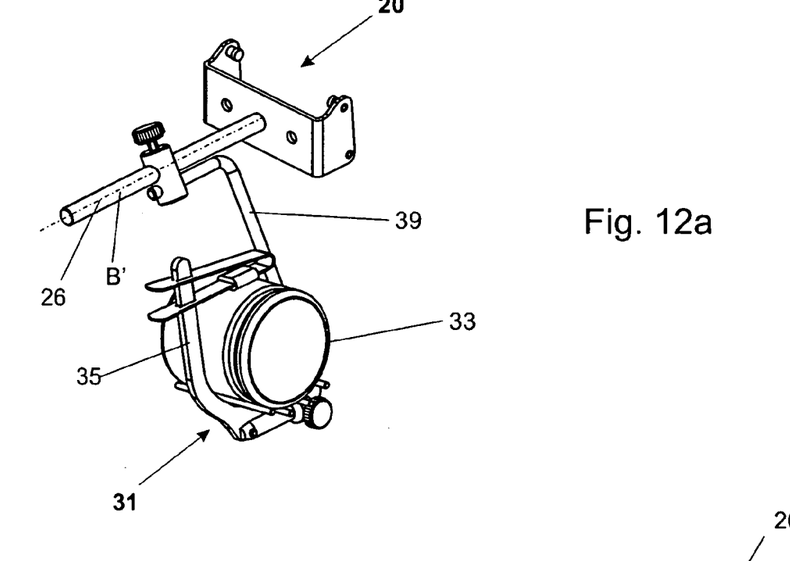
FIG. 12a represents the source container device of FIG. 10 in a slightly modified version, with a source container, shown in a three-dimensional view.
Figure 12B:
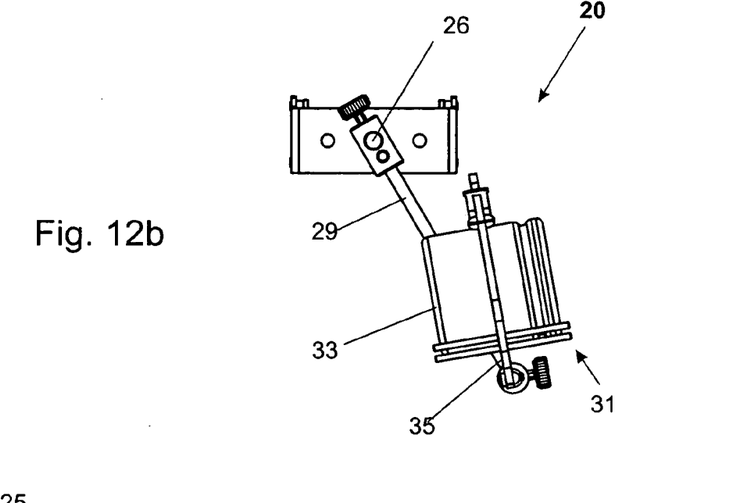
FIG. 12b represents the source container device of FIG. 12a with a source container, shown in a side view.

FIG. 12a shows a perspective view of the source container device 20 for the weighing material to be dispensed, analogous to FIGS. 10 and 11, but with a source container 33 set in place, lying with its cylindrical circumference on the grate bars. Depending on its fill level, the source container 33 can be rotated about the longitudinal axis B' of the rod 26 and thus be variably tilted relative to the horizontal. As the filling activity progresses and the fill level of the source container goes down, the latter can be tilted more and more towards the horizontal by adjusting the source container holder 31 by means of its attachment to the lower leg of the U-shaped bracket 29, whereby the access to the material that is to be dispensed into fill portions is facilitated. As a further convenience for taking material out of the source container 33, the attachment of the upper leg of the U-shaped bracket 29 to the rod 26 makes it possible to swivel the U-shaped bracket 29 with the source container holder 31 by rotating it about the longitudinal axis B' of the rod 26, for example to bring the source container holder 31 close to a lateral opening of the weighing compartment (see FIG. 12b), whereby the attending person is enabled to reach into the weighing compartment 3 only with a dispensing tool, for example with a spatula, without putting a hand into the weighing compartment, which could possibly cause undesirable temperature changes due to the heat originating from the hand.

Figure 12C:
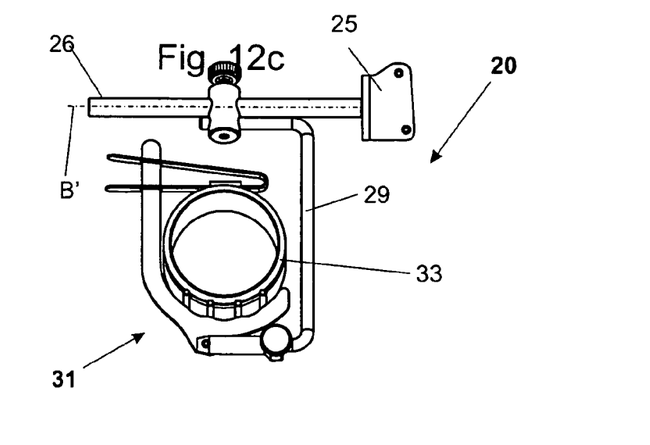
FIG. 12c represents the source container device of FIG. 12a with a source container, shown in a side view which is rotated by 90° in relation to the side view of FIG. 12b.

As can be seen in FIG. 12c, which shows the source container device 20 for the substance to be weighed into fill portions in a side view directed at the opening of the source container 33, the latter together with the source container holder 31 can be adjusted in its position along the axis B' of the rod 26 through a translatory displacement and—albeit to a small extent—along the two legs of the U-shaped bracket 29. Thus, the source container holder 31, and with it the source container 33, can be positioned within a wide range inside the weighing compartment 3. In particular, the suspension device 25 can be moved far enough along the holder system towards the weighing object carrier 2 that the dispensing process is reduced to a minimal distance between a source container 33 and a weighing receptacle, which works against the risk of a possible contamination of the weighing compartment 3 due to a possible spillage of the material to be dispensed into fill portions.

Figure 13:
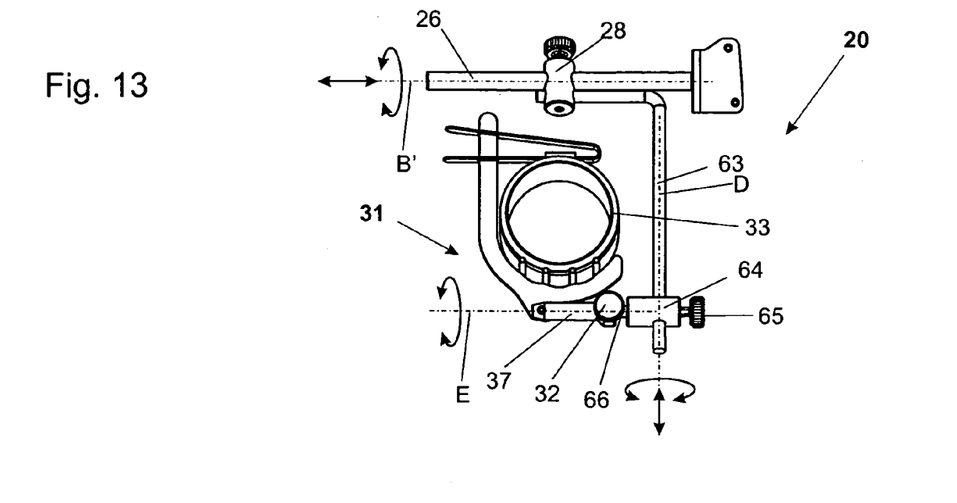
FIG. 13 represents a source container device in a further embodiment viewed from the same direction as in FIG. 12c.

In a representation analogous to FIG. 12c, a further embodiment of the source container device 20 is shown in FIG. 13. Parts that are identical to those in FIGS. 10 to 12c are identified by the same reference symbols and their description is not repeated here. Deviating from the foregoing embodiments, the source container device 20 does not have a U-shaped bracket 29, but has an L-shaped bracket 63 instead. The shorter L-leg is connected to the fastening element 28. The end of the longer L-leg carries a further cylinder-shaped fastener element 64. The longer L-leg passes through the cylinder-shaped fastener element 64 from a bore hole in the circumference of the latter. The further cylinder-shaped fastener element 64 is clamped tightly onto the L-shaped bracket 63 by means of a sixth clamping screw 65 entering the cylinder barrel of the element 64 from its end surface. By loosening the sixth clamping screw 65, the source container holder 31 device can be adjusted in its position along the longer L-leg in a translatory displacement, and/or it can be rotated about an axis D running along the longer L-leg. Thus, besides moving the source container holder 31 in a translatory displacement directed at a right angle to the rear wall 13, the source container holder 31 can in a further translatory displacement also be moved in a plane parallel to the rear wall 13 with the holder system 21 attached thereto. Analogously, besides a rotation about an axis D perpendicular to the rear wall 13, a rotation is also possible about an axis that runs in a plane parallel to the rear wall 13.

On the opposite side from the end surface with the sixth clamping screw 65, the cylinder-shaped fastening element 64 is stepped down to a rod-shaped continuing section 66 to which the source container holder 31 is removably fastened by means of the cylinder 37. Thus, by loosening the fifth clamping screw 32, the source container holder 37 can either be removed, or it can be rotated about an axis that runs along the cylinder axis E of the further fastening element 64. The length of the rod-shaped continuing section 66 further allows a certain range of variation in the distance of the source container holder 31 from the L-shaped bracket 63. Thus, the position of the source container holder is variable through a translatory displacement in any desired spatial direction. Furthermore, the source container holder 31 can be rotated about an axis arranged in any desired way relative to a spatial frame of reference, and consequently its orientation as well as its position in the weighing compartment is variable. It is considered self-evident that, depending on whether the dispensing is to be performed with the left or the right hand, the source container can be placed on the source container holder 31 with the container opening facing either one way or the other.

Figure 14:
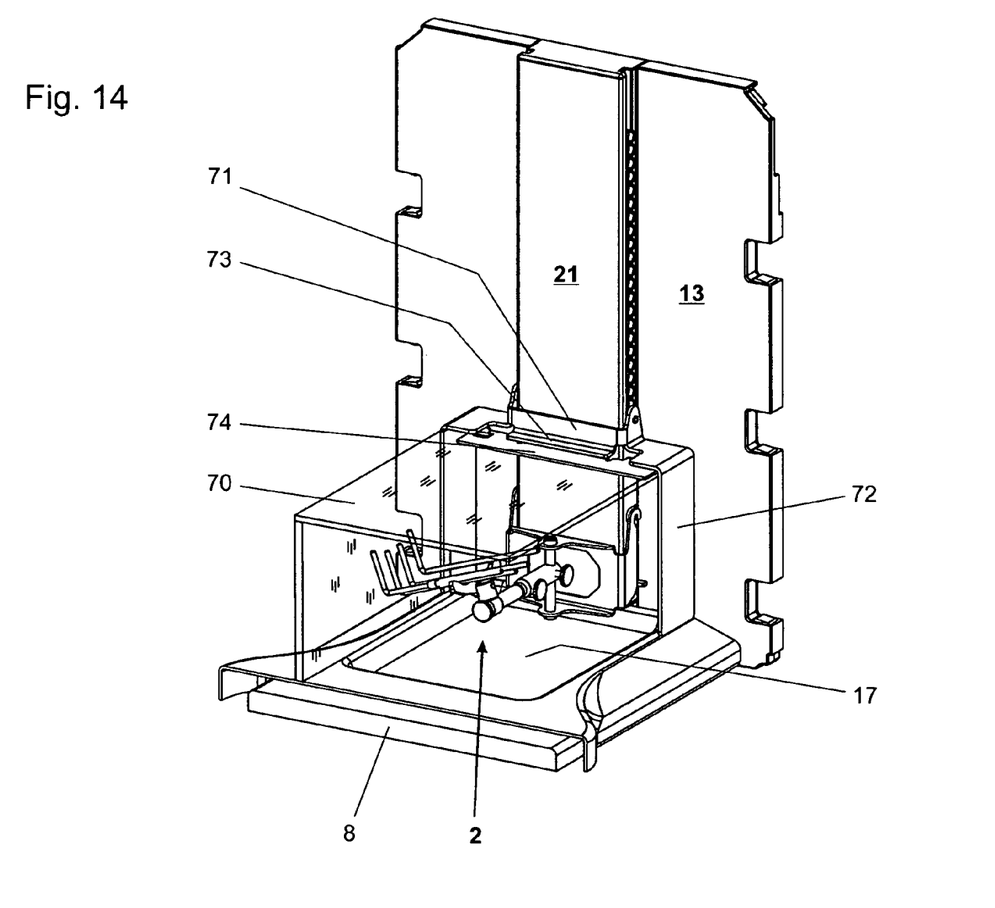
FIG. 14 represents a three-dimensional illustration of the view into the weighing compartment, including a weighing object carrier, wherein of the weighing-compartment-enclosing elements only the floor with the spill-catching tray arranged on it and the rear wall are shown, and wherein an intermediate floor is attached to the holder system.

An intermediate floor 70 which is shown in FIG. 14 can be installed on the holder system 21 by means of a further suspension device 71 which is provided either in addition or as an alternative to the suspension device 25 for the one or more source container holders 31 (not shown in this drawing). The intermediate floor provides a certain degree of protection for the weighing object carrier 2, e.g., against weighing material that could drop out of the source container 33. The intermediate floor 70 shown here is adjustable in its height above the floor 8 of the weighing compartment 3 or above the spill-catching tray 17. In the illustrated configuration, the intermediate floor is made of a transparent material, for example of glass, and is assembled from two flat plates that are connected to each other in an L-shaped combination. Thus, the intermediate floor 70 also forms a kind of draft shield for the weighing object carrier 2. The intermediate floor 70 is easy to install by sliding it into a holder 72 where it is clamped tight between an upper and a lower resilient clamping tongue 73 and 74, respectively.

The receptacle-filling system that includes the weighing object carrier and the source container device, as well as the weighing object carrier and the source container device by themselves have been illustrated in preferred embodiments. However, based on the teachings of the invention, those who are knowledgeable in the field will be able to realize further embodiments of the invention.

As a particular example, a position-adjustment device is not limited to fastener elements with clamping screws; it is also conceivable to use adjustment devices with slip clutches. Likewise conceivable is an adjustment device that includes one or more parallel-motion guiding devices, and one could also conceive of an adjustment device with one or more ball joints. Of course, adjustment devices using a combination of the afore-named elements are included within the range of possible embodiments of the invention It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A balance comprising:
   a weighing compartment;
   a balance housing that contains a weighing cell and forms a rear wall and a floor of the weighing compartment; and
   a weighing object carrier removably attached to a cantilevered extension of the weighing cell, said extension having a coupling arrangement reaching through passage openings in the rear wall of the weighing compartment, the weighing object carrier having a weighing object receiver setup as well as a position-adjusting device, the weighing object receiver setup being configured to be adjustable by translatory displacement within the weighing compartment in relation to a location of the coupling arrangement and lockable in a displaced position by the position-adjusting device of the weighing object carrier.

2. Balance according to claim 1, wherein an orientation and location of the weighing object receiver setup in the weighing compartment in relation to the coupling arrangement are adjustable by the position-adjusting device of the weighing object carrier through a translatory displacement and a rotation.

3. Balance according to claim 1, wherein a height of the weighing object receiver setup above the floor of the weighing compartment is adjustable.

4. Balance according to claim 1, wherein the weighing object receiver setup is translatable in a direction orthogonal to the rear wall and held in a displaced position.

5. Balance according to claim 2, wherein the weighing object receiver setup can be swiveled about a vertical axis near the rear wall.

6. Balance according to claim 2, wherein the weighing object receiver setup can be rotated about an axis that is orthogonal to the rear wall.

7. Balance according to claim 2, wherein the weighing object receiver setup has a seating area for a weighing receptacle, wherein the orientation of the weighing object receiver setup is adjustable through a rotation about an axis that is orthogonal to the seating area.

8. Balance according to claim 1, wherein the weighing object receiver setup has a seating area for a weighing receptacle, wherein the weighing object receiver setup is translatable in a direction orthogonal to the seating area, and held in a displaced position.

9. Balance according to claim 1, wherein the weighing object receiver setup has a seating area for a weighing receptacle and further has a peg on the side of the weighing object receiver setup that faces away from the seating area, and wherein a connecting element that connects the weighing object carrier to the weighing object receiver setup has a passage bore hole, wherein the peg engages the bore hole, and wherein the weighing object receiver setup is rotatable relative to the connecting element about an axis running along the peg, and/or the weighing object receiver is translatable along the peg relative to the connecting element.

10. Balance according to claim 1, comprising:
    a vertically oriented rod arranged near the rear wall, said rod passing through a connector element that connects to the weighing object receiver setup, wherein the height adjustment of the weighing object receiver setup is effected by sliding the connecting element along the rod.

11. Balance according to claim 2, wherein a connector element connecting the weighing object carrier to the weighing object receiver setup is configured as a pullout extension holder device, wherein said pullout extension holder device has an extension rod and a sleeve, wherein further said extension rod can slide into or out of the sleeve and/or the extension rod is rotatable about an axis that extends in the lengthwise direction of the sleeve.

12. Balance according to claim 1, wherein the weighing object receiver setup is configured in the shape of a grate with grate bars angled oft at 90° as a receiving seat for a weighing receptacle, or in the shape of a receiving sleeve as a receiving seat for a weighing receptacle consisting of an electrically isolating material, or in the shape of a channel as a receiving seat for an elongated weighing receptacle, or in the shape of a receiving cage as a receiving seat of a plurality of small narrow-necked reaction vessels.

13. Balance according to claim 12, wherein the grate bars of the weighing object receiver setup in the shape of a grate are encased at least partially by a polymer material to protect the weighing receptacle from slipping out of place.

14. Balance according to claim 1, wherein the weighing object receiver setup is removably arranged on the weighing object carrier.

15. Balance according to claim 1, wherein the cantilevered extension of the weighing cell to which the weighing object carrier is attached is provided with a receiving seat for at least one calibration weight of a calibration device.

16. A balance comprising:
    a weighing compartment;
    a balance housing that contains a weighing cell and forms a rear wall and a floor of the weighing compartment;
    a weighing object carrier which comprises a weighing object receiver setup and is attached to a cantilevered extension of the weighing cell, said extension having a coupling arrangement reaching through passage openings in the rear wall of the weighing compartment to removably attach the weighing object carrier; and
    a fixed holder system arranged at the rear wall of the weighing compartment to fasten a source container device comprising a source container holder at different heights above the floor, wherein the weighing object receiver setup is configured to be adjustable by translatory displacement within the weighing compartment in relation to the location of the coupling arrangement, and lockable in a displaced position, by the position-adjusting device of the weighing object carrier, and wherein the source container holder is configured for translatory displacement within the weighing compartment in relation to the location of the holder system, and lockable in a displaced position, by a position-adjusting device of the source container device.

17. Balance according to claim 16, wherein an orientation and location of the weighing object receiver setup within the weighing compartment are adjustable relative to the location of the coupling arrangement by the position-adjusting device of the weighing object carrier through a translatory displacement and a rotation.

18. Balance according to claim 16, wherein an orientation and location of the source container holder within the weighing compartment are adjustable relative to the location of the holder system by a position-adjusting device of the source container device through a translatory displacement and a rotation.

19. Balance according to claim 16, wherein the source container device is removably attached to the holder system by a suspension device.

20. Balance according to claim 16, wherein the receptacle-filling system has a source container device configured for receiving at least two source container holders.

21. Balance according to claim 16, wherein the source container device has a U-shaped bracket or an L-shaped bracket, to which U- or L-shaped bracket the source container holder is removably attached.

22. Balance according to claim 16, wherein the source container holder has a holder arm, wherein in a curved portion of holder arm grate bars arranged parallel to each other are attached to the holder arm.

23. Balance according to claim 22, wherein the grate bars are encased at least in part with a polymer material as a protective measure to keep a source container from slipping out of place.

24. Balance according to claim 19, wherein an intermediate floor can be attached to the holder system by a further suspension device, said suspension device being provided in addition to or as an alternative for the suspension device of the source container device.

25. Balance according to claim 24, wherein the intermediate floor is composed of two flat plates of a transparent material, which are connected to each other so that they form an L-shape.

26. Balance according to claim 16, wherein a height of the weighing object receiver setup above the floor of the weighing compartment is adjustable.

27. Balance according to claim 26, wherein the weighing object receiver setup is translatable in a direction orthogonal to the rear wall and held in a displaced position.

28. Balance according to claim 27, wherein the weighing object receiver setup can be swiveled about a vertical axis near the rear wall.

29. Balance according to claim 27, wherein the weighing object receiver setup has a seating area for a weighing receptacle, wherein the orientation of the weighing object receiver setup is adjustable through a rotation about an axis that is orthogonal to the seating area.

30. Balance according to claim 27, wherein the weighing object receiver setup has a seating area for a weighing receptacle, wherein the weighing object receiver setup is translatable in a direction orthogonal to the seating area, and held in a displaced position.

31. Balance according to claim 27, wherein the weighing object receiver setup has a seating area for a weighing receptacle and further has a peg on the side of the weighing object receiver setup that faces away from the seating area, and wherein a connecting element that connects the weighing object carrier to the weighing object receiver setup has a passage bore hole, wherein the peg engages the bore hole, and wherein the weighing object receiver setup is rotatable relative to the connecting element about an axis running along the peg, and/or the weighing object receiver setup is translatable along the peg relative to the connecting element.

32. Balance according to claim 27, comprising:
a vertically oriented rod arranged near the rear wall, said rod passing through a connector element that connects to the weighing object receiver setup, wherein the height adjustment of the weighing object receiver setup is effected by sliding the connecting element along the rod.

33. Balance according to claim 32, wherein a connector element connecting the weighing object carrier to the weighing object receiver setup is configured as a pullout extension holder device, wherein said pullout extension holder device has an extension rod and a sleeve, wherein further said extension rod can slide into or out of the sleeve and/or the extension rod is rotatable about an axis that extends in the lengthwise direction of the sleeve.

34. Balance according to claim 33, wherein the weighing object receiver setup is configured in the shape of a grate with grate bars angled off at 900 as a receiving seat for a weighing receptacle, or in the shape of a receiving sleeve as a receiving seat for a weighing receptacle consisting of an electrically isolating material, or in the shape of a channel as a receiving seat for an elongated weighing receptacle, or in the shape of a receiving cage as a receiving seat of a plurality of small narrow-necked reaction vessels.

35. Balance according to claim 34, wherein the weighing object receiver setup is removably arranged on the weighing object carrier.

36. Balance according to claim 17, wherein an orientation and location of the source container holder within the weighing compartment are adjustable relative to the location of the holder system by a position-adjusting device of the source container device through a translatory displacement and a rotation.

37. Balance according to claim 36, wherein the source container device is removably attached to the holder system by a suspension device.

38. Balance according to claim 37, wherein the receptacle-filling system has a source container device configured for receiving at least two source container holders.

39. Balance according to claim 38, wherein the source container holder has a holder arm, wherein in a curved portion of holder arm grate bars arranged parallel to each other are attached to the holder arm.

40. Balance according to claim 39, wherein an intermediate floor can be attached to the holder system by a further suspension device, said suspension device being provided in addition to or as an alternative for the suspension device of the source container device.

* * * * *